United States Patent Office 3,290,227
Patented Dec. 6, 1966

3,290,227
PROCESS FOR PRODUCTION OF CITRIC ACID
Mario Alexander Batti, Elkhart, Ind., assignor to Miles
  Laboratories, Inc., Elkhart, Ind., a corporation of
  Indiana
No Drawing. Filed June 11, 1964, Ser. No. 374,254
  7 Claims. (Cl. 195—36)

This invention relates to a process for the fermentation production of citric acid. More particularly, it relates to a process for obtaining desirable yields of citric acid when there has been an undesirable cessation of aeration to the citric acid fermentor during the fermentation process.

It is known in the art that citric acid can be produced in commercial quantities by the fermentation of carbohydrate materials using various strains of citric acid producing fungi. Certain strains of *Aspergillus niger* have proved to be particularly useful for this purpose. In addition, various strains of other species of fungi, such as *Aspergillus clavatus, Aspergillus wentii, Aspergillus luchuensis, Penicillium citrinum, Penicillium luteum* and the like, have been used with varying degrees of success.

One form of fermentation process employed in the art for citric acid production involves a submerged fermentation wherein the carbohydrate substrate, the citric acid producing fungal strain and nutrients necessary for fungal metabolism are contained within a vertical tank and air is passed through the tank contents. This air stream provides the oxygen-containing atmosphere necessary for fungal metabolism and also provides a means for agitating and mixing the fermentor tank contents. This stream also removes fermentation gaseous by-products, such as carbon dioxide.

Another form of fermentation process employed in the art for citric acid production involves the use of large surface area shallow trays containing the carbohydrate substrate, fungal strain and nutrients. An air stream passes over the fermentor tray surface to supply necessary oxygen for fermentation and to sweep away fermentation by-products.

In either of the above described citric acid fermentation processes the fungal growth and the citric acid production is greatly retarded if the aeration of the fermentation system is stopped or drastically reduced even for relatively short periods of time. The submerged fermentation process is the most sensitive to aeration interruption. Aeration cessation can cause a change in the fungal metabolism so as to produce materials other than citric acid. A resumption of normal aeration can sometimes allow citric acid production to begin again, but at a reduced rate, and only after an undesirable period of lowered production or no production. A fermentation run in which the aeration has been interrupted therefore requires additional fermentation time to produce a quantiay of citric acid approaching that of runs having uninterrupted aeration. However, fermentations with interrupted aeration under prior art conditions never produce citric acid yields equal to those of normal fermentations wherein the air supply has not been interrupted. Such periods of time with reduced or no production and additional time required to achieve a somewhat satisfactory yield are expensive in terms of production costs. Actual loss of materials used in preparing the fermentation media may also be suffered if the fermentation is terminated at a low level of citric acid concentration because of cessation of aeration of the medium.

It is understood that the cessation of aeration referred to herein is generally accidental and can occur frequently in some regions of the world where breakdowns in the electrical power supply necessary to operate blowers and compressors are common occurrences.

It has been found that the effect of aeration cessation on citric acid production is somewhat dependent upon when the air stoppage occurs and on the duration of such air stoppage. When the air stoppage occurs sufficiently close to the beginning of the fermentation so that appreciable growth of the fungal organism and appreciable changes in the composition of the fermentation medium have not had an opportunity to take place, the effect of the air stoppage is insignificant or minimal. In this case fermentation activity may be satisfactorily restored by resumption of the air supply to the medium. More specifically, it has been found that if the aeration cessation occurs within about 6 hours after inoculation of the fermentation medium with the fungal organism, no significant harm is done, and satisfactory fermentation activity may be restored simply by resuming the supply of air to the medium.

When the air supply to the medium is stopped after about 6 hours after inoculation of the fermentation medium, the fungal organism has already started to produce citric acid, thereby lowering the pH of the medium from the initial pH of about 2.5–2.9 to below about 2.0. In such circumstances, the resumption of citric acid production by the organism does not commence promptly upon resumption of aeration. It is delayed, and the extent of this delay in reactivation of the fermentation is generally greater the later the air stoppage occurs in the progress of the fermentation.

In the period after about 6 hours after inoculation of the fermentation medium when the pH of the medium is below about 2.0, a momentary interruption of the air supply to the fermentation medium, e.g., an interruption of less than about one minute, will have little or no effect on the progress of the fermentation after aeration is resumed. However, when the air stoppage has lasted for at least about two minutes, there is an appreciable increase in the time required for restoring satisfactory citric acid-producing fermentation activity. When the air stoppage interval is greater than about ten minutes during a period in the fermentation when citric acid is being produced, the delay in reactivation of the fermentation by a simple resumption of aeration is extended further, so that the time required to complete the fermentation may be several days longer than would have been needed if aeration of the medium had not stopped.

It is therefore a principal object of the present invention to provide a process for improving the fermentation activity of a citric acid-producing fermentation when the aeration of such fermentation has been interrupted during the production of citric acid.

It is a further object to provide such a process which is convenient and easy to perform.

In accordance with the present invention, a process is provided which comprises contacting a citric acid-producing fermentation medium in which citric acid has begun to form and to which aeration has been interrupted with an alkaline material to increase the pH of said medium to a value of at least about 2.0 and thereby promote citric acid-producing activity. More particularly, the process comprises contacting a citric acid-producing fermentation medium in which citric acid has begun to form resulting in a pH of less than about 2.0 and to which aeration has been interrupted with an alkaline material to increase the pH of said medium to a value from about 2.0 to about 4.0 and thereby promote citric acid-producing activity.

Any alkaline material may be employed in the present process to increase the fermentation medium pH which does not introduce harmful cations to the medium. Exemplary materials are ammonium hydroxide, barium hydroxide, calcium hydroxide, lithium hydroxide, sodium hydroxide, potassium hydroxide and the like. Ammonium hydroxide is the preferred alkaline material used in the present invention.

It should be noted that the process of the present invention is clearly distinguished from the prior art process of periodically adding ammonium hydroxide to a citric acid fermentation medium as a source of nitrogen nutrients. Such prior art process employed ammonium hydroxide in quantities such that the fermentation medium pH remained less than about 2.0. In the present process the alkaline material, such as ammonium hydroxide, is added in quantities such as to achieve a fermentation medium pH of from about 2.0 to about 4.0. Furthermore, the present process is only employed when the aeration to a citric acid-producing fermentation has been accidentally interrupted. In such case, the routine addition of a small quantity of ammonium hydroxide to supply nutrient nitrogen according to prior art teaching would not affect the retarded citric acid-producing activity. The above described increase in fermentation medium pH to a value of from about 2.0 to about 4.0 is generally achieved by adding an appropriate amount of alkaline material, such as ammonium hydroxide, substantially concurrently with the resumption of normal aeration to the fermentation medium. This minimizes any reduction in citric acid producing activity of the fermentation system. However, the pH adjustment can occur at any convenient time subsequent to the resumption of aeration. Once the citric acid-producing activity resumes, the pH of the fermentation medium will drop below a value of about 2.0 as citric acid is formed. The overall citric acid yield obtained by the present process is generally dependent upon the fermentation medium pH achieved immediately on addition of the alkaline material. As the pH obtained by addition of alkaline material increases above a value of about 2.0, the overall citric acid yield tends to increase. As the pH obtained by adding the alkaline material reaches a value over about 3.0, the overall citric acid yield tends to diminish based on the fungal metabolism at this pH level tends to form fungal mycelial structures having reduced citric acid-producing activity. Addition of $Cu^{++}$ and $Zn^{++}$ ions will overcome this tendency and enable improved citric acid yields to be obtained. While it is desirable to always add $Cu^{++}$ and $Zn^{++}$ ions along with the alkaline material to prevent the formation of undesirable fungal mycelial structures, it is most preferable to add the $Cu^{++}$ and $Zn^{++}$ ions when the alkaline material-achieved pH has a value from about 3.0 to about 4.0 The $Cu^{++}$ and $Zn^{++}$ ions are added in the form of water-soluble salts in an amount of each of from about 1 to about 100 parts per million (p.p.m.) by weight based on the weight of the fermentation medium. Copper sulfate and zinc sulfate are exemplary materials useful for introducing $Cu^{++}$ and $Zn^{++}$ ions to the fermentation medium, but other copper and zinc salts can be alternatively used.

The general process conditions for carrying out the citric acid fermentation are described, for example, in U.S. Patent Nos. 2,476,159 of L. B. Schweiger et al.; 2,492,667 of R. L. Snell et al.; 2,492,673 of J. C. Woodward et al.; 2,916,420 of L. B. Schweiger; 2,970,084 of L. B. Schweiger and 3,083,144 of M. W. Shepard. Such process conditions are followed in carrying out the present invention which relates principally to an improvement in the fermentation medium composition subsequent to an accidental interruption to the aeration of the fermentation medium. Such improvement enables satisfactory citric acid yields to be obtained in a substantially shorter period of time than are obtained by prior art processes having interrupted aeration.

The carbohydrate materials useful as the fermentation substrate for citric acid production according to the present invention can be any of the sugar-containing materials known to the art. Such materials are exemplified by sugar syrups obtained from natural sources, such as cane syrup, or they can be sugar-containing materials obtained by hydrolysis of starch, such as corn starch. The hydrolysis of starch to form sugar can be catalyzed by the well known use of hydrochloric acid or enzymes, such as amyloglucosidase.

The invention will be further described in the following examples.

EXAMPLE 1

A 20 liter quantity of corn starch hydrolyzate obtained by amyloglucosidase catalyzed hydrolysis and containing 18.5 weight percent copper reducing sugars expressed as dextrose was acidulated to a pH of 2.38 by adding 0.5 ml. C.P. sulfuric acid/liter of hydrolyzate. The acidified hydrolyzate was then heated to 113° F. (45° C.) and passed at a rate of 160 ml./min. through a 0.1 cu. ft. bed of Dowex 50 cationic ion-exchange material. This is a strongly acid cation exchange resin marketed by the Dow Chemical Co. The 19 liters of decationized effluent had a pH of 1.32. Nutrients were added to this effluent in an amount of 0.015 weight percent $KH_2PO_4$, 0.1 weight percent $MgSO_4 \cdot 7H_2O$, 50 p.p.m. (parts per million by weight) $Ca^{++}$ ions as $CaCl_2 \cdot 2H_2O$ and 0.2 weight percent $(NH_4)_2CO_3$. HCl was added in an amount of 9 ml. to adjust the pH to 2.82. This mixture was autoclaved for about 5 minutes at 245° F. (118° C.) and 16–18 p.s.i.g. to sterilize it. This fermentation substrate and nutrient mixture was then cooled to room temperature. A 4 liter quantity was charged to a vertical aerated fermentor. This fermentor consisted of a vertical glass pipe 4-in. O.D. and 48-in. long. The ends of the pipe were sealed with stainless steel end plates provided with air inlet and outlet passages. A glass sparger was attached to the air inlet line near the bottom of the glass pipe to provide desired air distribution throughout the fermentor contents. To the 4 liter fermentor contents were added 0.6 p.p.m. by weight $Cu^{++}$ ions as $CuSO_4 \cdot 5H_2O$ and 0.6 p.p.m. by weight $Zn^{++}$ ions as $ZnSO_4 \cdot 7H_2O$. Also added were 15 p.p.m. by weight oxygen as hydrogen peroxide to react with any sulfite present in the liquid. Aeration was started at 5 liters of air per minute. The fermentor contents were then inoculated with an aqueous suspension of *Aspergillus niger* spores. The fermentor was then heated to 86° F.–90° F. (30° C.–32° C.) and aeration continued at the above rate. At 141.5 hours after inoculation aeration was stopped for 30 minutes and then resumed at its former rate. The pH of the fermentor contents at the time the aeration stopped was 1.52. When aeration resumed, $NH_4OH$ was added in an amount of 24 ml. to increase the pH to 2.4. Also added at this time were 3 p.p.m. by weight $Cu^{++}$ and 3 p.p.m. by weight $Zn^{++}$. The fermentation was continued for a total of 306 hours and then terminated. Samples were taken periodically throughout the entire fermentation run and analyzed for citric acid content. The following table indicates the production rate citric acid during this fermentation.

*Table 1*

CITRIC ACID PRODUCTION IN GRAMS PER HOUR

| Time Interval (Hours After Inoculation) | Citric Acid Produced (Average Grams/hr.) |
|---|---|
| 41–66 | 2.7 |
| 66–93 | 3.2 |
| 93–118 | 2.6 |
| 118–139 | 2.9 |
| [1] 139–163 | 0.5 |
| 163–186 | 3.8 |
| 186–211 | 3.3 |
| 211–236 | 2.8 |
| 236–259 | 3.4 |
| 259–284 | 1.7 |
| 284–306 | 1.8 |

[1] Air off 30 min. at 141.5 hr.

It can be seen from the above data that adding an alkaline material to increase the pH of the fermentor contents from 1.52–2.4 after aeration had stopped allowed desirable rates of citric acid production to be resumed within 21 hours after aeration was resumed.

When the pH is not adjusted in accordance with the present invention, aeration stoppage can result in lack of desirable citric acid production for a considerably longer period of time. This is shown by the following example.

EXAMPLE 2

A 20 liter quantity of high test sugar syrup was defecated by adding 2.84 g. of commercial phosphoric acid (85 percent) for each gallon of the syrup and then adding $Ca(OH)_2$ to a pH of 7.5. The resulting precipitate was removed by filtration. The filtrate was acidulated, decationized, sterilized and mixed with nutrients in the manner described in Example 1. A 4 liter quantity containing 786 g. of sugar was charged to a vertical aerated fermentor of the type described in Example 1. $Cu^{++}$ and $Zn^{++}$ ions as well as $H_2O_2$ were added in the amounts described in Example 1, and fermentation was started in the manner described in Example 1. At 65 hours after inoculation aeration was stopped for 30 minutes and then resumed at its former rate. The fermentation was continued for a total of 11 days (264 hours) and then terminated. Samples were taken periodically during the entire fermentation run and analyzed for citric acid content. The following table indicates the production rate of citric acid during the fermentation.

Table 2
CITRIC ACID PRODUCTION IN GRAMS PER HOUR

| Time Interval (Hours After Inoculation) | Citric Acid Produced (Average Grams/hr.) |
|---|---|
| [1] 48–72 | 3.65 |
| 72–96 | 0 |
| 96–120 | 0 |
| 120–144 | 1.37 |
| 144–168 | 2.52 |
| 168–192 | 2.37 |
| 192–216 | 2.78 |
| 216–240 | 3.0 |
| 240–264 | 3.18 |

[1] Air off 30 min. at 65 hr.

It can be seen from the above data that stopping aeration for 30 minutes once citric acid production has commenced can prevent any substantial amounts of citric acid from being produced for about 60 hours. The resumption of citric acid production within 24 hours or less resulting from alkaline addition to increase pH, as shown in Example 1 above, is thus a substantial improvement over the prior art.

The remarkable effect of the present invention upon citric acid production is shown in the following example.

EXAMPLE 3

A 5 gallon quantity of corn starch hydrolyzate obtained by amyloglucosidase catalyzed hydrolysis and containing 18.25 percent (weight/volume basis) copper reducing sugars expressed as dextrose was acidulated and decationized according to the techniques described in Example 1. A 20 liter quantity of the resulting fermentation substrate was mixed with nutrients and sterilized as described in Example 1. A 4 liter quantity containing 730 grams of glucose was charged to a vertical aerated fermentor of the type described in Example 1. To this were also added 0.6 p.p.m. by weight $Cu^{++}$ ions as $CuSO_4 \cdot 5H_2O$ and 0.6 p.p.m. by weight $Zn^{++}$ ions at $ZnSO_4 \cdot 7H_2O$. Aeration was started at 5 liters of air per minute. The fermentor contents were then inoculated with an aqueous suspension of *Aspergillus niger* spores. The fermentor was then heated to 86° F.–90° F. (30° C.–32° C.) and aeration continued at the above rate for 24 hours. After 24 hours the aeration rate was increased to 7 liters of air per minute. At 138 hours after inoculation aeration was stopped for 40 minutes and then resumed at its former rate. At 188 hours after inoculation the pH of the fermentor contents was raised from 1.59–2.3 by addition of $NH_4OH$. Also added at this time was 3 p.p.m. by weight $Cu^{++}$ and 3 p.p.m. by weight $Zn^{++}$. Samples were taken periodically throughout the entire fermentation run and analyzed for citric acid content. The following table indicates the production rate of citric acid during this fermentation.

Table 3

| Time Interval (Hours After Inoculation) | Citric Acid Produced (Average Grams/hr.) |
|---|---|
| 44–89 | 2.5 |
| 89–138 | 3.1 |
| [1] 138–163 | 0.04 |
| 163–187 | 0 |
| [2] 187–209 | 0 |
| 209–234 | 2.8 |
| 234–257 | 2.4 |
| 257–281 | 2.7 |
| 281–304 | 0.7 |

[1] Air off 40 min. at 138 hr.
[2] pH increased at 188 hr.

It can be seen from the above data that aeration cessation for 40 minutes can stop citric acid production for at least 46–71 hours. In contrast to this, adding alkaline material to increase pH to above about 2.0 can restore citric acid production within about 21 hours.

Under prior art conditions, if aeration is stopped for a period of about an hour, the overall citric acid yield is drastically reduced. The process of the present invention enables citric acid yields to be obtained, even in the face of aeration cessation, that approach or are even equal to yields obtained from fermentations that have not been interrupted. This is shown in the following Example 4.

EXAMPLE 4

High test sugar syrup was defecated in the manner described in Example 2 and acidulated, decationized, sterilized and mixed with nutrients in the manner described in Example 1. A 4 liter quantity containing 816 g. of sugar was charged to a vertical aerated fermentor of the type described in Example 1. To this were added 0.4 p.p.m. by weight $Cu^{++}$ and 0.4 p.p.m. by weight $Zn^{++}$. Aeration was started at 7 liters of air per minute. The fermentor contents were then inoculated with an aqueous suspension of *Aspergillus niger* spores. The fermentor was then heated to 86° F.–88° F. (30° C.–31° C.) and aeration continued at the above rate for 9 days and 17 hours (total of 233 hours). The product was analyzed and found to contain 713 g. of citric acid. This run was a "Control" to demonstrate typical prior art practice wherein the aeration was not interrupted.

The above procedure was repeated with several other fermentations except that after 89 hours the aeration was stopped for one hour and then resumed at the former rate. In all the runs the pH of the fermentor contents was about 1.4–1.5 when the aeration was stopped. In one run, nothing was added to the fermentor after aeration was resumed. This demonstrated typical prior art practice for an interrupted aeration run. In the other runs, $NH_4OH$ was added in amounts to arrive at various pH values in exces of pH 2.0. In some runs additional $Cu^{++}$ and $Zn^{++}$ ions were also added. The products of all the fermentation runs were analyzed for citric acid yields. The results are shown in the following table.

Table 4
CITRIC ACID PRODUCTION IN TOTAL GRAMS

| Run No. | Air Off, Hours | Fermentor pH After NH₄OH Addition | Cu⁺⁺ Added, p.p.m. | Zn⁺⁺ Added, p.p.m. | Citric Acid Produced, Grams |
|---|---|---|---|---|---|
| 1 | 0 | (¹) | 0 | 0 | 713 |
| 2 | 1 | (¹) | 0 | 0 | 387 |
| 3 | 1 | 2.42 | 0 | 0 | 624 |
| 4 | 1 | 2.4 | 3 | 3 | 674 |
| 5 | 1 | 2.4 | 25 | 25 | 670 |
| 6 | 1 | 2.72 | 0 | 0 | 691 |
| 7 | 1 | 3.68 | 0 | 0 | 664 |
| 8 | 1 | 3.74 | 100 | 100 | 717 |

¹ None added.

It is apparent from the above data that when no pH adjustment is made after aeration is stopped and then resumed (run 2), the yield of citric acid is drastically reduced as compared to a run wherein the aeration was not stopped (run 1). As the pH adjustment is increased above about 2.0, the citric acid yield tends to increase, as exemplified by runs 2, 3 and 6. The addition of $Cu^{++}$ and $Zn^{++}$ ions can tend to also increase the citric acid yield, as exemplified by comparing runs 3, 4 and 5. As the pH adjustment is increased to a value over about 3.0, the $Cu^{++}$ and $Zn^{++}$ ions are preferably added to maintain high yields of citric acid. (See runs 7 and 8.)

In summary, this invention relates to a process improvement for increasing the citric acid-producing activity of a fermentation medium to which aeration has been undesirably interrupted. The improvement comprises adding an alkaline material, preferably ammonium hydroxide, to the fermentation medium so as to increase the fermentation medium pH to from about 2.0 to about 4.0 and then resuming aeration and normal fermentation procedures. Preferably, $Cu^{++}$ and $Zn^{++}$ ions are also added at the time the pH is adjusted. This improved process enables desirable citric acid yields to be obtained in a shorter time as compared to prior art aeration-interrupted processes.

What is claimed is:

1. A process for producing citric acid which comprises contacting a citric acid-producing fermentation medium in which citric acid has begun to form resulting in a pH of less than about 2.0 and to which aeration has been interrupted for at least about two minutes subsequent to the beginning of citric acid formation with an alkaline material to increase the pH of said medium to a value of at least about 2.0, thereby promoting the citric acid-producing activity of said medium.

2. A process according to claim 1 wherein the alkaline material is added to increase the pH of the fermentation medium to from about 2.0 to about 4.0.

3. A process according to claim 1 wherein $Cu^{++}$ and $Zn^{++}$ ions are also added to the fermentation medium substantially concurrently with the alkaline material.

4. A process according to claim 3 wherein the $Cu^{++}$ and $Zn^{++}$ ions are each added in an amount of from about 1 to about 100 p.p.m. by weight based on the weight of the fermentation medium.

5. In a process for the production of citric acid which comprises inoculating a fermentation medium containing a carbohydrate substrate and nutrients with a citric acid-producing strain of fungus and then aerating the inoculated fermentation medium to form citric acid resulting in a pH of less than about 2.0 and in which the aeration has been interrupted for at least about two minutes subsequent to the beginning of citric acid formation, the improvement which comprises adding an alkaline material to said fermentation medium to increase the pH of said medium to a value of at least about 2.0, thereby promoting the citric acid-producing activity of said medium.

6. A process according to claim 5 wherein the alkaline material is added to increase the pH of the fermentation medium to from about 2.0 to about 4.0.

7. A process according to claim 5 wherein $Cu^{++}$ and $Zn^{++}$ ions are also added to the fermentation medium substantially concurrently with the alkaline material.

References Cited by the Examiner
UNITED STATES PATENTS
3,083,144    3/1963    Shepard _____ 195—36

A. LOUIS MONACELL, *Primary Examiner.*

L. M. SHAPIRO, *Assistant Examiner.*